(12) United States Patent
Choi et al.

(10) Patent No.: US 8,370,196 B2
(45) Date of Patent: Feb. 5, 2013

(54) MULTIMEDIA ADVERTISING SERVICE THROUGH A MOBILE COMMUNICATION NETWORK AND MULTIMEDIA CONTENT CONTROLLING APPARATUS AND METHOD OF A MOBILE TERMINAL SUPPORTING SAID SERVICE

(75) Inventors: Min Ju Choi, Seongnam-si (KR); Kyeong Seok Kim, Goyang-si (KR); Jong Woo Choi, Yongin-si (KR); Jun Hyung Kim, Seoul (KR); Sung Cheol Hong, Seoul (KR); Eon Hwa Jeong, Seoul (KR); Gi Seon Nam, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 1935 days.

(21) Appl. No.: 10/508,616

(22) PCT Filed: Mar. 22, 2003

(86) PCT No.: PCT/KR03/00565
§ 371 (c)(1),
(2), (4) Date: Sep. 23, 2004

(87) PCT Pub. No.: WO03/081446
PCT Pub. Date: Oct. 2, 2003

(65) Prior Publication Data
US 2005/0177419 A1 Aug. 11, 2005

(30) Foreign Application Priority Data
Mar. 23, 2002 (KR) .................. 10-2002-0015890

(51) Int. Cl.
*G06Q 30/00* (2012.01)
*G07G 1/14* (2006.01)

(52) U.S. Cl. ......................................................... 705/14
(58) Field of Classification Search ..................... 705/14
See application file for complete search history.

(56) References Cited

U.S. PATENT DOCUMENTS

| | | | |
|---|---|---|---|
| 6,356,838 B1 * | 3/2002 | Paul | 701/209 |
| 2001/0047272 A1 * | 11/2001 | Frietas et al. | 705/1 |
| 2002/0022476 A1 | 2/2002 | Go | |
| 2002/0022485 A1 * | 2/2002 | Kolsky et al. | 455/452 |
| 2002/0034190 A1 * | 3/2002 | Baratz et al. | 370/450 |
| 2002/0035605 A1 * | 3/2002 | McDowell et al. | 709/206 |
| 2004/0220851 A1 * | 11/2004 | Silver et al. | 705/14 |

FOREIGN PATENT DOCUMENTS

| | | |
|---|---|---|
| JP | 2002-354547 | 12/2002 |
| KR | 1020010094521 | 11/2001 |
| KR | 1020020007535 | 1/2002 |
| KR | 1020020017037 | 3/2002 |
| WO | WO 9959283 A2 * | 11/1999 |

* cited by examiner

*Primary Examiner* — Colleen Hoar
(74) *Attorney, Agent, or Firm* — Lowe Hauptman Ham & Berner, LLP

(57) ABSTRACT

The present invention relates to apparatus and method of providing a multimedia advertising service through a mobile communication network. In the present invention, a content server downloads ad contents to a mobile terminal along with content-displaying condition and the mobile terminal having received the ad contents displays the received ad contents according to the content-displaying condition when an event specified by the content-displaying condition occurs. Afterwards, a content-displayed history is uploaded to the content server by the mobile terminal.

17 Claims, 5 Drawing Sheets

MULTIMEDIA ADVERTISING SERVICE THROUGH A MOBILE COMMUNICATION NETWORK AND MULTIMEDIA CONTENT CONTROLLING APPARATUS AND METHOD OF A MOBILE TERMINAL SUPPORTING SAID SERVICE

This application is the National Phase of PCT Application No. PCT/KR03/00565, filed Mar. 22, 2003.

1. TECHNICAL FIELD

The present invention relates to a method for providing a multimedia advertising service, and an apparatus and method for controlling multimedia contents of a mobile terminal supporting the service, and more particularly to a method for providing a multimedia advertising service, and an apparatus and method for controlling multimedia contents of a mobile terminal supporting the service, which enable a multimedia content service; provided from a mobile communication network accessible to a wireless Internet, to be mainly based on a service provider (network) rather than a service user (terminal), such that the multimedia contents provided to the terminal can be actively displayed without a user's manipulation and the service provider can acquire display history information associated with the displayed contents.

2. BACKGROUND ART

Generally, a conventional method for providing multimedia contents accesses a wireless Internet in response to a user's terminal manipulation and downloads desired multimedia contents. That is, the conventional method is mainly based on a terminal. Recently, a network-based method using a wireless application protocol (WAP) push system has been developed.

Where a subject for providing the multimedia contents is based on the service provider, the terminal-based method cannot appropriately provide the multimedia contents to the user. Further, the network-based method needs more advanced techniques for providing network-based contents.

In order to display the downloaded contents on a corresponding screen through the terminal-based or network-based method, the terminal must designate a display screen in response to the user's manipulation. The service provider cannot recognize display history information indicating how much information is displayed on the terminal, etc.

Thus, the conventional methods for providing the multimedia contents have a problem in that the service provider cannot promote an effect of advertising, etc. capable of being acquired by actively providing and displaying the multimedia contents to a plurality of specified or unspecified terminals and cannot analyze the advertising effect.

3. DISCLOSURE OF THE INVENTION

Therefore, the present invention has been made in view of the above problems, and it is one object of the present invention to provide a method for providing a multimedia advertising service in a mobile communication network, which enables a multimedia content service provider to be a subject, enables the service provider to provide desired multimedia contents to a plurality of specified or unspecified terminals, and enables the provided multimedia contents to be actively displayed on a corresponding terminal.

It is another object of the present invention to provide an apparatus and method for controlling multimedia contents of a mobile terminal for a multimedia advertising service in a mobile communication network, which enable the multimedia contents provided from a service provider to be actively displayed without a user's manipulation and enable the service provider to acquire display history information associated with the displayed contents.

In accordance with one aspect of the present invention, the above and other objects can be accomplished by the provision of a method for providing a multimedia advertising service by downloading multimedia contents from a server to a plurality of specified or unspecified mobile terminals on the basis of a wireless application protocol (WAP) push system in a mobile communication network, comprising the steps of: (a) enabling the server to download at least one multimedia content and display condition information associated with the content; and (b) when an event corresponding to the display condition information occurs, enabling the mobile terminal to execute and display the downloaded content according to the display condition information.

Preferably, the method may further comprise the step of: (c) enabling the mobile terminal to upload the display history information associated with the displayed content to the server when the mobile terminal accesses the server to download the content.

Preferably, the display condition information may comprise a corresponding content identifier (ID), a name of the event, a display time interval, the number of displays on an interval-by-interval basis and a period of display time, which are linked to each other.

Preferably, the event may comprise a terminal power-on state, terminal power-off state, short message service (SMS) message transmission state, call reception state, wireless Internet access state, wireless Internet release state, standby state, download screen display state and/or buffering screen display state.

Preferably, the display condition information may be configured so that a plurality of contents associated with a single event can be periodically displayed.

Preferably, the step (b) may be selectively performed according to a corresponding mode setting state of the mobile terminal.

In accordance with another aspect of the present invention, there is provided an apparatus for controlling multimedia contents of a mobile terminal accessible to a wireless Internet for a multimedia advertising service, comprising: download means for accessing a corresponding server in response to access information received on the basis of a wireless application protocol (WAP) push system and downloading a corresponding multimedia content and display condition information associated with the content from the server; storage means for separately storing the downloaded content and display condition information; monitoring means for monitoring various events occurring at a mobile terminal operation in real time; scheduling means for scheduling a display of the corresponding multimedia content associated with a current event according to a result of the monitoring and the stored display condition information; and content execution means for executing and displaying the corresponding multimedia content according to the schedule.

Prefer ably, the download means may perform a download operation with separating or combining simple image service (SIS), moving picture experts group (MPEG), wavelet, flash and/or 3D-based contents.

Preferably, the download means may discriminate various contents on a content-by-content basis, and store the discriminated contents in the storage means.

Preferably, the content execution means may comprise: a multimedia player for reproducing the multimedia content.

Preferably, the storage means may store the display history information associated with the displayed content.

In accordance with yet another aspect of the present invention, there is provided a method for controlling multimedia contents of a mobile terminal accessible to a wireless Internet for a multimedia advertising service, comprising the steps of: (a) accessing a corresponding server in response to access information received on the basis of a wireless application protocol (WAP) push system and downloading a corresponding multimedia content and display condition information associated with the content from the server; (b) separately storing the downloaded content and display condition information; (c) monitoring various events occurring at a mobile terminal operation in real time; (d) scheduling a display of the corresponding multimedia content associated with a current event according to a result of the monitoring and the stored display condition information; (e) executing and displaying the corresponding multimedia content according to the scheduling; (f) storing the display history information associated with the displayed content; and (g) providing the stored display history information to the server.

Preferably, the step (g) may be carried out when the mobile terminal accesses the server at the step (a).

Preferably, the access information may be received in the form of a short message.

Preferably, the step (a) may comprise the steps of: determining a state of a corresponding service mode setting when the access information is received, and wherein a step subsequent to the determination may be selectively performed.

Preferably, a step of setting a service mode may comprise the steps of: accessing the server on the basis of the access information received through a short message to send a service request or service release request; and setting the service mode to an on or off state in response to a service request-related response message or service release request-related response message.

Preferably, a step of setting a service mode may comprise the steps of: accessing the server on the basis of a user's manipulation to send a service request or service release request; and setting the service mode to an on or off state in response to a service request-related response message or service release request-related response message.

In accordance with the present invention, a service provider automatically downloads multimedia contents without a customer's terminal manipulation, and flexibly adjusts a display screen of the downloaded contents and display conditions, and acquires information associated with the number of displays of the downloaded contents actually displayed on a terminal, such that the service provider can promote an effect of advertising, etc. by actively providing and displaying the multimedia contents to a plurality of specified or unspecified terminals in a multimedia advertising service and can analyze the advertising effect.

4. BRIEF DESCRIPTION OF THE DRAWINGS

The above and other objects, features and other advantages of the present invention will be more clearly understood from the following detailed description taken in conjunction with the accompanying drawings, in which.

5. BEST MODE FOR CARRYING OUT THE INVENTION

A method for providing a multimedia advertising service, and an apparatus and method for controlling multimedia contents of a mobile terminal supporting the service according to preferred embodiments of the present invention will be described in detail with reference to the annexed drawings.

Figure 1:
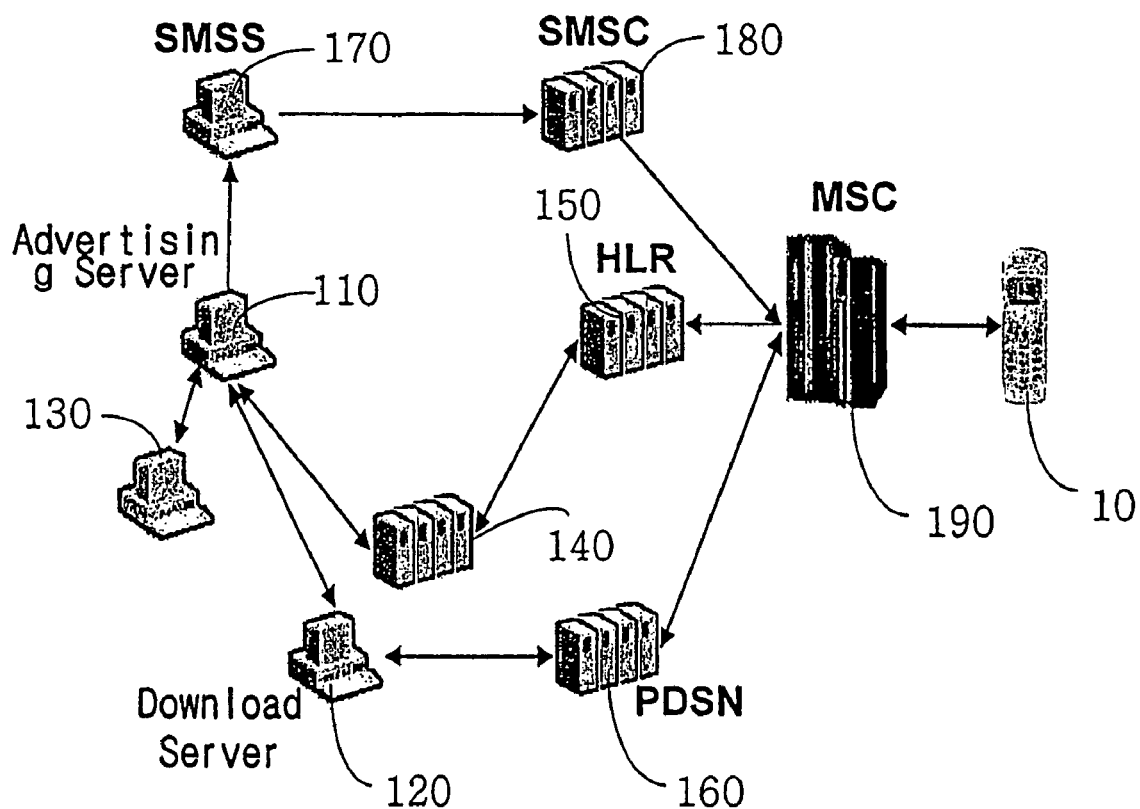
FIG. 1 is a view illustrating the configuration of a mobile communication system to which a method for providing a multimedia advertising service in a mobile communication network is applicable in accordance with the present invention.

FIG. 1 is a view illustrating the configuration of a mobile communication system to which a method for providing a multimedia advertising service in a mobile communication network is applicable in accordance with the present invention.

Referring to FIG. 1, the mobile communication system includes an advertising server 110, download server 120, advertising analysis server 130, location management server 140, home location register (HLR) 150, packet data serving node (PDSN) 160, short message service server (SMSS) 170, short message service center (SMSC) 180, mobile switching center (MSC) 190 and mobile terminal 10.

The advertising server 110 is a server having the functionality of managing subscriber information for a multimedia (or moving picture) advertising service, the functionality of scheduling and administrating an advertising condition and time, the functionality of sorting terminals as objects appropriate for receiving the multimedia advertising service, and the functionality of driving a short message service (SMS) message transmission. The advertising server 110 can function as a wireless application protocol (WAP) server.

The download server 120 connected to the advertising server 110 stores multimedia contents as advertisements and downloads corresponding multimedia advertisements to the corresponding terminal 10.

The advertising analysis server 130 linked to the advertising server 110 manages response data relating to a displayed advertisement, i.e., advertisement display history information, provided from the terminal 10.

The location management server 140 linked to the advertising server 110 manages real-time location information of a subscriber. The HLR 150 is the conventional communication network's component interworked with the location management server 140. The HLR 150 is a database keeping various information associated with mobile communication subscribers, and various information associated with subscriber terminals.

The PDSN 160 is the conventional communication network's component interworked with the download server 120. The PDSN 160 is responsible for the functionality of performing an interface between a mobile communication switching system and a data core network, etc.

The SMSS 170 and SMSC 180 are the conventional communication network's components. The SMSS 170 and SMSC 180 linked to the advertising server 110 are responsible for the functionality of sending SMS messages.

The MSC 190 is linked to the HLR 150, PDSN 160 and SMSC 180. The MSC 190 handles incoming and outgoing calls associated with a mobile communication subscriber's terminal, registers the terminal location information, processes a hand off, and processes basic and supplementary services.

The terminal 10 displays multimedia advertisements downloaded from the download server 120 according to display condition information. The terminal 10 uploads display history information associated with the displayed multimedia advertisements to the advertising server 110.

Figure 2:
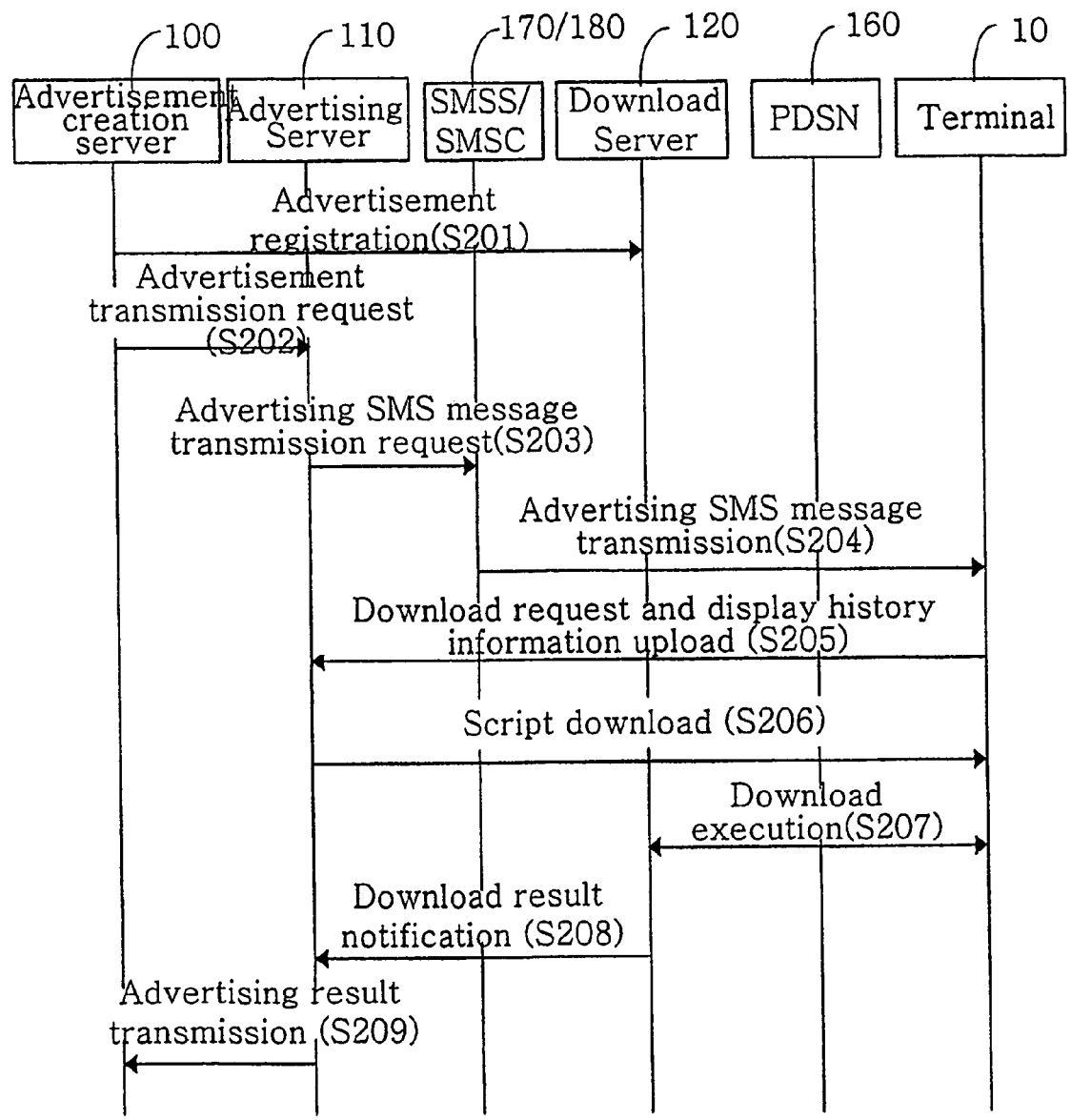
FIG. 2 is a flowchart illustrating the method for providing the multimedia advertising service in the mobile communication network in accordance with the present invention.

FIG. 2 is a flowchart illustrating the method for providing the multimedia advertising service in the mobile communication network in accordance with the present invention. Since the method is applied to the network system shown in FIG. 1, the method will be described along with an operation of the network system.

First, if a multimedia content (containing advertisement display condition information) as an advertisement created by an advertisement creating server 100 is registered in the download server 120, the download server 120 assigns a corresponding service ID (SID) to the registered content and stores the assigned SID at step S201.

Then, the advertisement creating server 100 transmits, to the advertising server 110, an advertisement transmission request message containing the advertisement display condition information, information of a target subscriber for a desired advertisement, a transmission date, an SID and a callback uniform resource locator (URL) at step 8202. In response to the advertisement transmission request message, the advertising server 110 extracts a mobile identification number (MIN) of the target subscriber and requests the SMSS/SMSC 170/180 to send an advertising SMS message at step S203. In response to the request, the SMSS/SMSC 170/180 transmits the advertising SMS message to the terminal 10 having a corresponding MIN through the MSC 190 at step S204.

Figure 3:
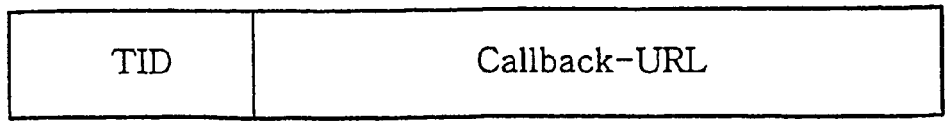
FIG. 3 is a view illustrating a format of a short message in accordance with the present invention.

As shown in FIG. 3, the advertising SMS message contains a tele-service ID (TID) and callback URL information. The TID is information indicating an SMS message for an advertising service in accordance with the present invention. The advertising SMS message's TID is different from a general SMS message's TID.

After the user of the terminal 10 confirms the received advertising SMS message, e.g., after the terminal 10 automatically accesses the advertising server 110 in response to a specified key input by the user, the terminal 10 requests the advertising server 110 to download a content of a corresponding SID. At this time, the terminal 10 uploads, to the advertising server 110, display history information associated with currently accumulated and stored advertisement contents at step S205.

In response to the download request, the advertising server 110 downloads a wireless markup language (WML) script containing download information to the terminal 10 at step S206. The terminal 10 downloads the content of a corresponding SID and advertisement display condition information contained in the content from the download server 120 on the basis of the WML script at step S207.

Then, the download server 120 notifies the advertising server 110 of information indicating whether the download is successful at step S208. The advertising server 110 collects statistics on a result of the advertising on the basis of the display history information, acquired at the above step S205, and information indicating whether the download is successful, acquired at the above step S208. The advertising server 110 provides the collected statistics to the advertisement creation server 100 periodically or at a time of receiving a request so that data of the collected statistics can be managed in the advertisement creation server 100 at step S209.

Figure 4:
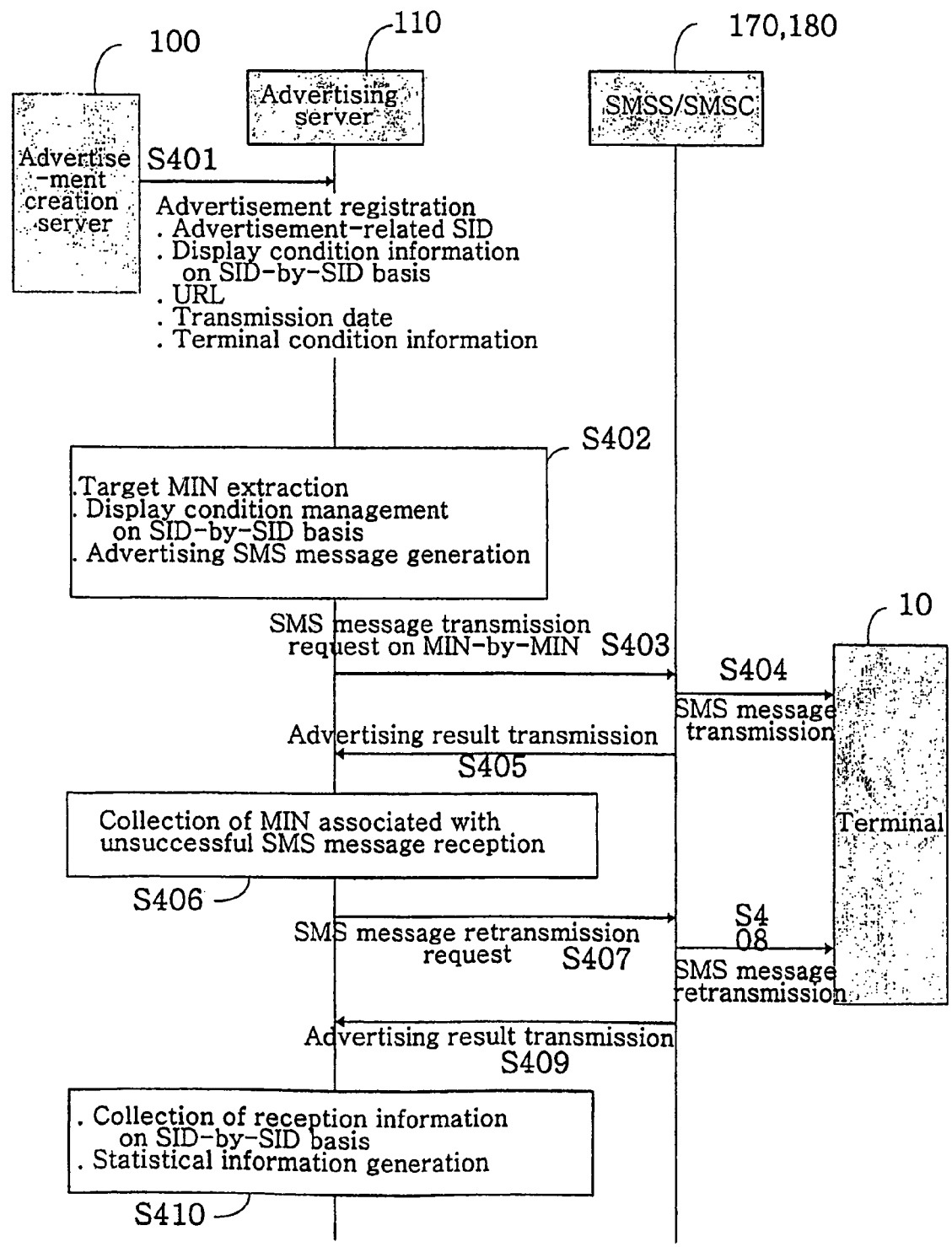
FIG. 4 is a detailed flowchart illustrating a procedure of sending an advertising short message service (SMS) message shown in FIG. 2.

FIG. 4 is a detailed flowchart illustrating a procedure of sending an advertising SMS message shown in FIG. 2.

First, the advertisement creation server 100 registers information associated with the advertisement in the advertising server 110 at step S401.

When the information associated with the advertisement is registered, there must be set and registered an SID of a corresponding advertisement, display condition information on an SID-by-SID basis (i.e., display condition information to be used in the terminal), a URL needed for downloading the corresponding advertisement, a transmission date, terminal condition information (i.e., information of a subscriber receiving an advertising SMS message), etc.

The advertising server 110 extracts a target MIN of the corresponding advertisement SID on the basis of the registered information, manages the display condition information on the SID-by-SID basis, and generates the advertising SMS message at step S402. Then, the advertising server 110 requests the SMSS 170 to transmit the advertising SMS message on a target MIN-by-MIN basis at step S403. In response to the request, the SMSC 180 transmits the advertising SMS message to the terminal 10 corresponding to the target MIN at step S404.

At step S405, the SMSS 170 transfers, to the advertising server 110, a result of the advertising SMS message transmission performed at the above step S404. The advertising server 110 collects the MIN associated with an unsuccessful advertising SMS message transmission at step S406, and requests the SMSS 170 to retransmit the advertising SMS message to the terminal 10, having the MIN associated with the unsuccessful advertising SMS message transmission, the predetermined number of times at step S407. Then, the SMSC 180 retransmits the advertising SMS message to the terminal 10 having the corresponding MIN at step S408. The SMSS 170 transfers a result of the retransmission to the advertising server 110 at step S409. The advertising server 110 collects reception information on the SID-by-SID basis and generates statistical information based on the collected reception information at step S410.

Figure 5:
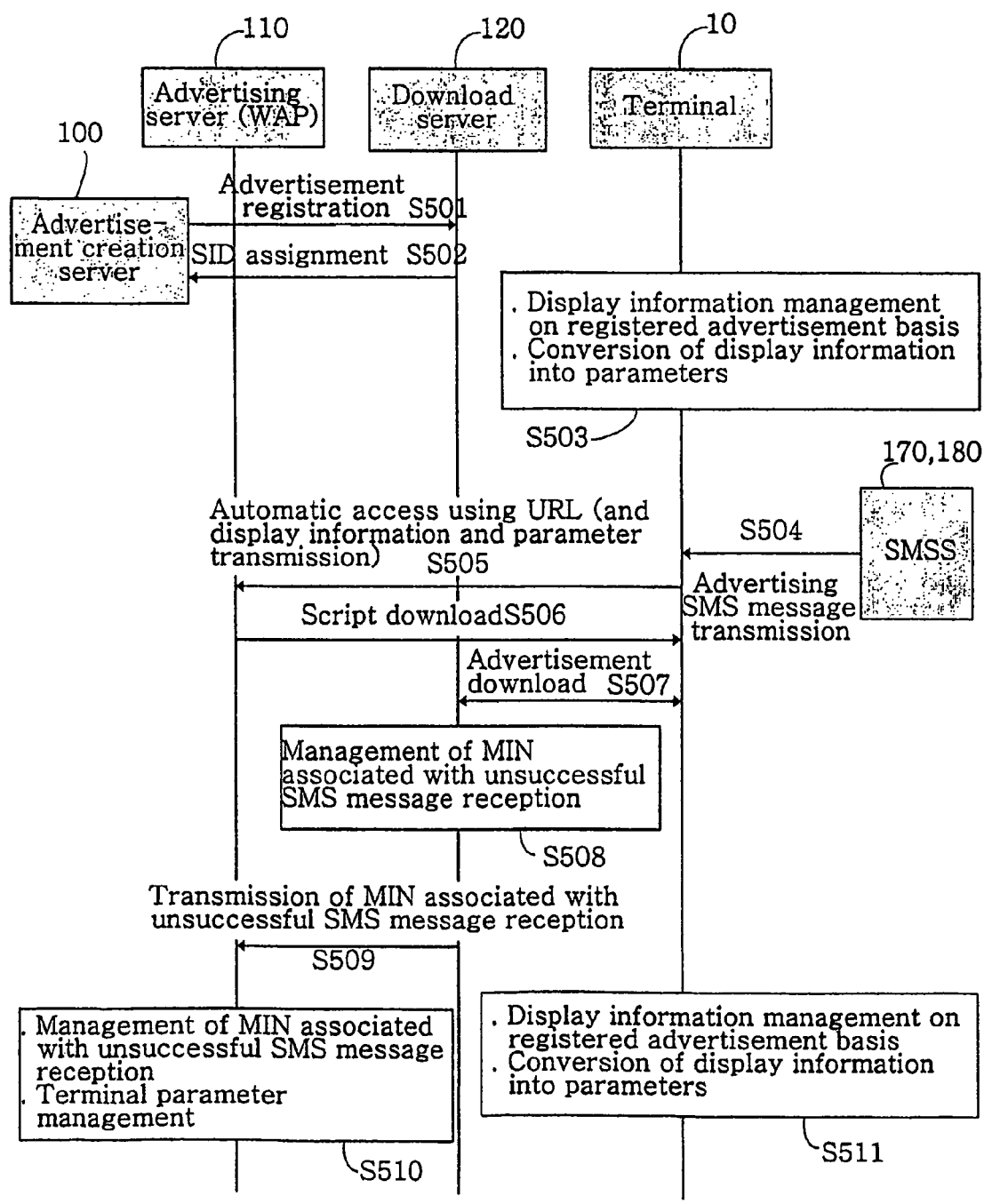
FIG. 5 is a detailed flowchart illustrating a procedure of downloading advertisements (i.e., multimedia contents) shown in FIG. 2.

FIG. 5 is a detailed flowchart illustrating a procedure of downloading advertisements (i.e., multimedia contents) shown in FIG. 2.

First, if the multimedia content created by the advertisement creation server 100 is registered in the download server 120 at step S501 as at the above step S201 shown in FIG. 2, the download server 120 provides, to the advertisement creation server 100, SID information assigned to the registered multimedia content at step S502.

The terminal 10 manages display history information on a registered advertisement-by-advertisement basis, and converts the information into predetermined format-based parameters at step S503. If the advertising SMS message is received from the SMSS/SMSC 170/180 at step S504, the terminal 10 automatically accesses the advertising server 110 on the basis of the URL contained in the advertising SMS message, requests the advertising server 110 to download the advertisement content, and uploads parameters associated with the advertisement display history information to the advertising server 110 at step S505.

The advertising server 110 transmits a script for the advertisement content download and a corresponding SID to the terminal 10 at step S506. Thus, the terminal 10 accesses the download server 120, and downloads the advertisement content corresponding to the SID and display condition information associated with the advertisement content from the download server 120 at step S507.

For reference, the display condition information includes a corresponding content identifier (ID), a name of the event occurring at the mobile terminal, a display time interval, the number of displays on an interval-by-interval basis and a period of display time, which are linked to each other. The event includes a terminal power-on state, terminal power-off state, SMS message transmission state, call reception state, wireless Internet access state, wireless Internet release state and/or standby state. When an apparatus and method for controlling the multimedia contents of the mobile terminal are described, the display condition information will be described in detail.

At step S508, the download server 120 manages an MIN associated with the successful download (or successful reception) according to a result of the above step S507. At step S509, the download server 120 transmits information of the MIN associated with the successful download to the advertising server 110. At step S510, the advertising server 110 manages the MIN associated with the successful download and the parameter information transmitted at the above step S505.

As at the above step S503, the terminal 10 continuously manages display history information on a registered advertisement-by-advertisement basis, and converts the display history information into parameters. Then, if the advertising SMS message is received, the terminal 10 repeatedly performs the above step S505 and other steps.

Functionalities of the advertising server 110 in accordance with the present invention are discriminated step by step, and the discriminated functionalities will be described in detail.

Before the advertisement SMS message is transmitted, there is performed a procedure of registering an advertisement content ID, an SID of a corresponding advertisement, display condition information on an SID-by-SID basis (i.e., display condition information to be used in the terminal), a URL needed for downloading the corresponding advertisement, a transmission date, terminal condition information (i.e., information of a subscriber receiving an advertising SMS message), etc. Then, the advertising server 110 sorts a target MIN and generates the advertising SMS message. The advertising server 110 requests the SMSS 170 to transmit the advertising SMS message for the target MIN. After the advertising SMS message is transmitted, the advertising server 110 collects the MIN associated with a successful or unsuccessful advertisement reception and generates statistical information associated with, a result of the SMS message transmission. After a corresponding content is downloaded, the advertising server 110 collects the MIN associated with a successful or unsuccessful advertisement reception, and collects and analyzes upload information (i.e., display history information) from the terminal 10. When the advertising SMS message is retransmitted, the advertising server 110 retransmits the same SMS message to the terminal of the MIN associated with the unsuccessful SMS message reception or download the predetermined number of times. The advertising server 110 performs the same functionalities as after performing the SMS message transmission and download. When the statistical information is managed, the advertising server 110 manages information associated with an advertisement transmission, a result of the SMS message transmission and a result of the download on the advertisement content ID-by-ID basis, an MIN of a terminal receiving the content, and advertisement display history information uploaded from the terminal.

Next, the apparatus and method for controlling the multimedia contents of the mobile terminal for implementing the method for providing the multimedia advertisement service in accordance with the present invention will be described in detail.

Figure 6:
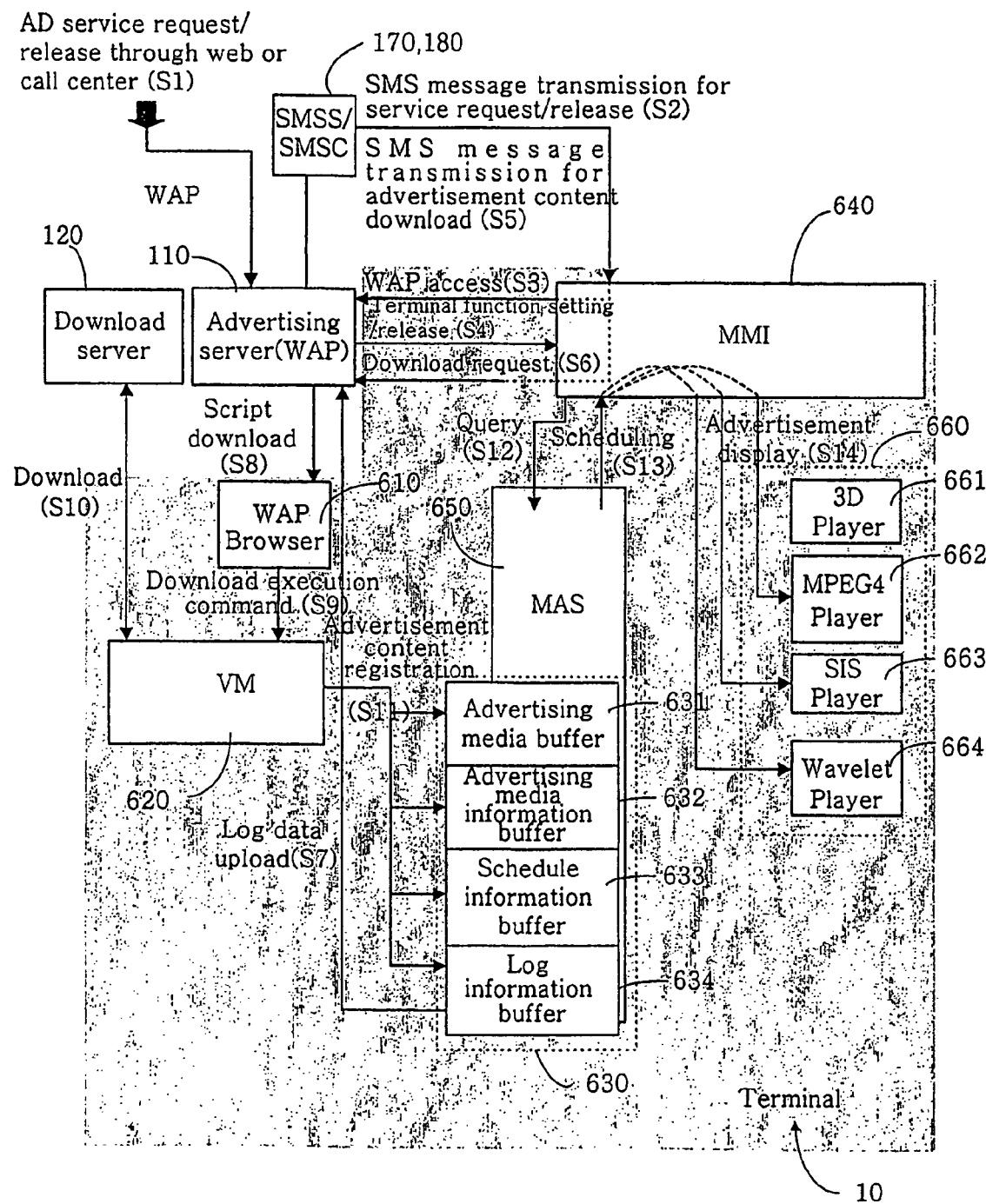
FIG. 6 is a view illustrating the configuration of an apparatus for controlling the multimedia contents of the mobile terminal and a flowchart of a method thereof in accordance with the present invention.

FIG. 6 is a view illustrating a configuration of the apparatus for controlling the multimedia contents of the mobile terminal and a flowchart of the method thereof in accordance with the present invention. The multimedia contents controlling apparatus includes a download unit, storage unit, monitoring unit, control unit, management unit and content execution unit.

The download unit accesses a corresponding server in response to access information received on the basis of a wireless application protocol (WAP) push system, and downloads a corresponding multimedia content as an advertisement and display condition information associated with the content from the server. The download unit includes a WAP browser 610 and a virtual machine (VM) 620 developed on the basis of a Java or C language.

The storage unit separately stores the downloaded multimedia content and display condition information. The storage unit includes a nonvolatile storage unit 630, which includes an advertising media buffer 631, advertising media information buffer 632, schedule information buffer 633 and log information buffer 634.

The monitoring and control units include a man machine interface (MMI) 640 for monitoring various events occurring at a corresponding terminal operation in real time and controlling various functionalities.

The management unit includes a management controller 650 for scheduling a display of the corresponding multimedia content associated with a current event according to a result of the monitoring and the stored display condition information, 125 and managing the display history information.

The content execution unit executes and displays the corresponding multimedia content according to the schedule. The content execution unit includes a content execution module 660 on a multimedia type-by-type basis, which includes a three dimensional (3D) player 661 for reproducing 3D-based contents, a moving picture experts group (MPEG) player 662 for reproducing MPEG-based contents, a simple image service (SIS) player 663 for reproducing SIS-based contents and a wavelet player 664 for reproducing wavelet-based contents.

The management controller 650 includes a mobile advertisement scheduler (MAS). The MAS 650 is divided into the first layer (ad_Layer) and second layer, (mas_Layer).

The first layer includes application program interfaces (APIs) needed for the MMI 640 to read or write necessary information for a mobile advertising service in SMS and WAP browsers being conventional terminal software, the VM and a screen display state. The first layer is provided as a library source. For example, an SIS-based terminal includes seven screens of a terminal power-off screen, standby screen, incoming signal reception screen, wireless Internet access screen, wireless Internet release screen and SMS message transmission screen. A wavelet or MPEG4 service-based terminal includes nine screens of the above-described seven screens, a download screen and a buffering screen. The software must call an API at an appropriate time point.

The second layer includes APIs to be called so that the MAS 650 can write various data items needed for a mobile advertising service to the nonvolatile storage unit 630. The various data items include advertising media, advertisement schedule information, advertisement log data, advertising media information and mobile advertising operation information.

The VM 620 performs a download operation with separating or combining SIS, MPEG, wavelet, flash and 3D-based contents. Then, the downloaded contents are stored in the storage unit 630 on a content-by-content basis. Content data and content display condition information are separated from the downloaded content. Then, the content data is stored in the advertising media buffer 631, and the content display condition information is stored in the schedule information buffer 633. Under the control of the MMI 640, the log information buffer 634 stores the display history information associated with the displayed contents.

Further, reference numerals 110, 120, 170 and 180 shown in FIG. 6 indicate the advertising server 110, download server 120, SMSS 170 and SMSC 180 shown in FIG. 1.

Next, the method for controlling the multimedia contents of the mobile terminal supporting the multimedia advertising service in accordance with the present invention will be described with reference to FIG. 6.

First, if the service user makes an advertising service request (or advertising service release request) through a web or call center, the advertising server 110 receives the advertising service request (or advertising service release request) at step S1. The advertising server 110 requests the SMSS 170 to transmit an SMS message corresponding to the advertising service request (or advertising service release request) and then the SMSC 180 transmits the SMS message at step S2. The SMS message corresponding to the service request (or service release request) includes service request (or service release request)-related information such as the TID, and the URL as shown in FIG. 2.

After the MMI 640 automatically accesses the advertising server 110 through the WAP on the basis of the URL contained in the received SMS message at step S3, a service mode for the advertising service of the present invention is set (or released) in response to a service mode setting (or release) message received from the advertising server 110 at step S4. It is assumed that an operating mode is set to the service mode in the following description.

If the terminal 10 receives an advertising SMS message for advertisement content download, as shown in FIG. 2, from the SMSS/SMSC 170/180 at step S5, the MMI 640 of the terminal 10 accesses the advertising server 110 on the basis of the URL contained in the received advertising SMS message and requests the advertising server 110 to download a corresponding advertisement content at step S6.

In response to the request, the advertising server 110 downloads an advertisement content script to the WAP browser 610 of the terminal 10 at step S8. The WAP browser 610 sends a download execution command to the VM 610 on the basis of the script at step S9.

The VM 620 accesses the download sever 120 in response to the execution command, and downloads a corresponding advertisement content from the download server 120 at step S10. Then, advertisement content data and content display condition information are separated from the downloaded content. The advertisement content data is stored in the advertising media buffer 631 of the storage unit 630 and the display condition information is stored in the schedule information buffer 633 at step S11.

Then, the MMI 640 monitors a current operating state of the terminal 10 and determines an event occurring, i.e., a terminal power-on state, terminal power-off state, SMS message transmission state, call reception state, wireless Internet access state, wireless Internet release state and/or standby state. Every time the event occurs, the MMI 640 queries, to the MAS 650, which content must be displayed according to the occurring event at step S12. In response to the query, the MAS 650 searches for the display condition information stored in the schedule information buffer 633 and transfers display schedule information to the MMI 640 at step S13.

The MMI 640 drives a corresponding player of the players 661 to 664 provided in the content execution module 660 to reproduce and display the advertisement contents on the basis of the display schedule information at step S14. Display history information (i.e., information indicating the displayed contents and information indicating how many-contents are displayed on which event screen) associated with the advertisement contents displayed at the above step S14 is stored in the log information buffer 634 by the MMI 640. When the above step S6 is performed, the stored display history information is uploaded to the advertising server 110 at step S7.

As described above, the method for controlling the multimedia contents of the mobile terminal supporting the multimedia advertising service in accordance with the present invention has been described with reference to FIG. 6. Next, technical requirements for implementing the present invention will be described in detail.

The MAS 650 is a module for managing advertisement service data (multimedia contents), and manages display history information, i.e., log data associated with a multimedia advertisement schedule and advertisement display.

Through the multimedia advertisement scheduling functionality, the MAS 650 determines which advertisement must be displayed when the terminal is in a specific operating state at a specific time. The specific operating state includes a terminal power-on state, terminal power-off state, SMS message transmission state, call reception state, wireless Internet access state, wireless Internet release state and/or standby state. The MAS 650 performs the multimedia advertisement scheduling functionality on the basis of schedule information (or display condition information) associated with advertisement data downloaded to the terminal 10.

The log management functionality associated with the advertisement display means the functionality of generating information indicating how many advertisements the corresponding subscriber (service user) has actually viewed through the terminal 10. Through the log management functionality, the advertising server 110 is notified of the generated information.

Types of advertising services applicable for the present invention include all multimedia content services such as SIS, wavelet, MPEG, 3D and flash-based advertising services, etc.

A multimedia advertising service uses multimedia data as advertisement contents. The terminal 10 for supporting the multimedia advertising service must be equipped with the media player 663 for reproducing a multimedia image on a terminal screen.

Detailed methods for implementing the multimedia advertising service of the present invention are as follows. For convenience, serial numbers are given to the following items.

1. In a service subscription method, a customer can subscribe for an advertising service through a WAP or using a web or conventional call center. Methods for subscribing for the advertising service through various paths are as follows.

1-1. In a service subscription through the WAP, procedures of enabling the customer to make a service request through the WAP are as follows.

1-1-1. In a procedure of executing a script function on the WAP server's page, the script function must be executed so that the customer's terminal can recognize the service subscription if the customer makes the service request through the WAP. The script function is implemented in the WAP server.

1-1-2. In a procedure of checking a master flag, the terminal must recognize the service request from the terminal and then check the mater flag indicating an advertising service operation of the present invention. However, if the master flag has been previously enabled, it is determined that the advertising service is ongoing since the customer has previously made the service request. The terminal does not perform the following procedures.

In order for the terminal to check the master flag indicating the advertising service operation, a function to be called is provided to a library.

1-1-3. In a procedure of creating an available advertising-dedicated space, the terminal must create the available advertising-dedicated space so that the terminal can receive the advertising service (hereinafter, referred to as an AD service) if the service request is not a repeated request when the terminal checks the master flag. Where the advertising-dedicated space is insufficient (i.e., where a predetermined storage space is not available because of too many content files downloaded by the customer), the customer must delete one or more of the downloaded content files to create the available advertising-dedicated space. In particular, the oldest downloaded content files must be first deleted. Thus, the terminal must store information of a time point when the customer's content files are downloaded.

1-1-4. In a procedure of setting the master flag, the terminal must set the master flag indicating the AD service operation after the available storage space for the advertisement is created when the terminal checks the storage space, or part of the contents is deleted to create the available space to be occupied. If the master flag has been set, the terminal must perform the same functionality as the AD service terminal. The master flag is not changed until the AD service is released.

In order for the terminal to set the master flag indicating the AD service operation, a function to be called is provided to the library.

It must be noted that the terminal must keep a value of the master flag and AD service subscription information also at a time of initializing the terminal using the terminal initialization functionality.

1-1-5. In a procedure of initializing the nonvolatile memory (i.e., the storage unit 630) associated with the AD service, the buffer (i.e., the nonvolatile memory) associated with the AD service must be initialized after the master flag indicating the AD service operation is set. The types of buffers associated with the AD service include the advertising media buffer 631, advertising media information buffer 632, schedule information buffer 633 and log information buffer 634. For the initialization, a function to be called by the terminal is provided to the library.

1-1-6. In a procedure of returning the terminal to the WAP, the terminal must be returned to the WAP if the above-described procedures are completed after the AD service request is accomplished over the WAP. At this time, the URL used for an access is a callback URL received when the script is executed. Meanwhile, when the AD service request is made through the web or call center, the above-described procedure is not performed and the terminal must cut off the access to the WAP.

1-2. A method for subscribing for the AD service through the web or call center performs the following procedures.

1-2-1. In a procedure of transmitting an SMS message for the AD service subscription, the SMSS 170 must transmit an SMS message (having TI=specified value) to the customer when the AD service request is made through the web or call center. An SMS message format for AD service subscription is the same as that for a service release and advertisement content download (as shown in FIG. 3). However, headers of the messages have values of different TIDs. The SMS message format for the AD service subscription will be described below.

1-2-2. In a procedure of checking the master flag, the master flag indicating the AD service operation is checked. After the terminal determines the received SMS message for the service subscription using the message's header, it must be determined that the repeated service subscription request exists. However, if the master flag has been previously enabled, it is determined that the advertising service is ongoing since the customer has previously made the service request. The terminal does not perform the following procedures. In order for the terminal to check the master flag indicating the advertising service operation, a function to be called is provided to the library.

1-2-3. In a procedure of enabling the terminal to automatically access the WAP server, the terminal automatically accesses the WAP server with the callback URL contained in the SMS message for the AD service subscription if the terminal has not made the repeated service request after checking the master flag. If the terminal has already accessed the WAP server, the terminal having received the SMS message automatically accesses the WAP server for the AD service subscription after the terminal waits for the user to terminate an existing operation through the WAP.

1-2-4. A method for enabling the terminal to subscribe for the AD service after accessing the WAP server performs the same procedures as in the above-described method for enabling the terminal to subscribe for the AD service. However, since the customer has not accessed the WAP server before an SMS message is received, the terminal does not return to the WAP when the service subscription procedure is completed. That is, if the service subscription procedure is completed, the terminal must terminate the access to the WAP server. Further, when the script is executed, the callback URL being the parameter has a null value.

2. In a method for downloading an advertisement content, the terminal having subscribed for the AD service receives an SMS message (having TI=specified value) for the advertisement content download for the AD service. A format of the SMS message for the advertisement content download for the AD service is the same as that of the SMS message for the AD service subscription or release. However, headers of the messages have different values.

Upon receiving an SMS message for the advertisement content download, the terminal must first check a value of the master flag indicating the AD service operation and determine whether the master flag value is enabled. If the master flag value is disabled since the AD service subscription has not been appropriately performed due to a service subscription SMS message loss, WAP access failure or script execution failure, the terminal performs no operation for downloading the advertisement content.

On the other hand, although the SMS message for a specific advertisement download is repeatedly received, the terminal must perform the same procedure as described above. After the terminal downloads the same advertisement or invalid advertisement, the VM 620 appropriately processes the downloaded advertisement.

If the master flag is enabled, the terminal automatically accesses the WAP server using the URL information contained in the advertising SMS message. Then, the terminal uploads an existing log data for the AD service and downloads new advertisement data.

A method for processing the SMS message to download the advertisement content will be described below.

1) In a procedure of checking the master flag, the terminal must first check a value of the master flag indicating the AD service operation and determine whether the master flag value is enabled, upon receiving the SMS message for the advertisement content download. If the master flag value is disabled since the AD service subscription has not been appropriately performed due to a service subscription SMS message loss, WAP access failure or script execution failure, the terminal performs no operation for downloading the advertisement content.

2) In a procedure of uploading the log data for the AD service, the terminal automatically starts the WAP browser 610 if it is determined that the master flag indicating the AD service operation is enabled. At this time, the URL data for an initial access includes a URL contained in the SMS message for downloading the advertisement content for the AD service and the log data for the existing AD service as parameters. If the terminal successfully accesses the advertising server (WAP server) 110 using the URL for the initial access, the log data is uploaded to the advertising server 110.

The log data includes a screen ID, an advertisement ID and the number of displays. Here, the screen ID is a constant indicating a display screen state, the advertisement ID is an advertisement identifier stored at a time of performing the download, and the number of displays is the accumulated number of displays associated with a corresponding advertisement.

3) In a procedure of downloading the advertisement content, an existing script for enabling the VM 620 to download the content is executed by the web browser 61 and the advertisement content begins to be downloaded, if the terminal successfully accesses the WAP server using the URL for the initial access. In particular, a download method is adjustable in the following cases.

3.1) In the case where the download is stopped because of a problem of a system or network while the download is ongoing, the VM 620 resumes the download using the resume functionality.

3.2) In the case where the user strokes a button while the download is ongoing, the terminal displays a screen corresponding to the stroked button after stopping the download.

3.3) In the case where the terminal's folder or flip is open, the download can be appropriately performed.

3.4) In the case where an SMS message is received in a call connection state, the terminal attempts to access the network after waiting for a call to be terminated.

3.5) In the case where the download is ongoing, a message indicating that an advertisement content is being downloaded is displayed on a screen.

4) In a procedure of installing the advertisement content, the downloaded advertisement content contains advertisement media and advertisement schedule data. The VM 620 calls an appropriate API of the MAS 650 according to a type of advertisement data, stores the advertisement media and schedule data in the storage unit 630, and initializes the log data and advertising media data. At this time, the VM 620 processes the downloaded advertisement as invalid data when the same advertisement is repeatedly downloaded or an invalid advertisement is downloaded.

3. In a method for displaying the advertisement content, the downloaded advertisement is displayed according to the schedule information from the MAS 650'.

The MAS 650 schedules the advertisement to be displayed on the screen on the basis of a predetermined display rule and downloaded schedule information. Information associated with the advertisement displayed in a specified operating state at a specified time is created and managed as log data.

3-1. In a rule for displaying the advertisement content, screens capable of displaying the advertisement are different according to types of media, but the display rule is common irrespective of the types of media. In the case of an SIS, 3D or flash-based service, the screens capable of displaying the advertisement include seven screens of a terminal power-off screen, standby screen, incoming signal reception screen, wireless Internet connection screen, wireless Internet release screen and SMS delivery screen. In a wavelet or MPEG4 service-based service, the screens include nine screens of the above-described seven screens, a download screen and a buffering screen.

The advertising server 110 can designate a plurality of advertisements to be displayed on all display screens and an operation of displaying the plurality of advertisements on the screens is based on a round-robin method.

Further, the advertising server 110 can set a basic advertisement. If no valid advertisement according to a result of the advertisement schedule exists and the basic advertisement is set, the MAS 650 notifies the terminal of the set basic advertisement. However, if no valid advertisement to be displayed on a specified screen (e.g., a standby screen or call reception screen) exists, the MAS 650 outputs the null value and the terminal can perform a display operation on the basis of the SIS designated by the customer.

The schedule information (i.e., display condition information), contained in each advertisement content, downloaded by the advertising server includes at least one screen for displaying the advertisement, a display time interval (corresponding to the maximum number of 24 advertisements for one day), the maximum number of displays for one day and an advertisement expiration date.

Where each screen state is initiated, the terminal determines, through an API of the MAS 650, which advertisement data must be reproduced, and reproduces selected advertisement data according to the schedule.

When the AD service is activated, the terminal dimly processes a font on a menu other than the specified screen so that the customer does not select the font. When the customer sets a screen other than the specified screen, a message of "AD service is ongoing" is displayed so that the customer cannot set a screen other than the specified screen. Otherwise, if the AD service is disabled, the above-described functionality must be released.

3-2. In a procedure of logging information of the number of displays (or generating log data, i.e., display history information), the MAS 650 schedules the advertisement content and simultaneously generates and manages the log data associated with the advertisement display. The number of specified advertisement displays is incremented every time the advertisement is displayed until the number of displays reaches the maximum number of displays corresponding to each time period. Further, the number of displays is counted day by day and is reset to zero when a next day begins. If a folder is closed within two seconds where the terminal is a folder phone, the number of displays is not counted. However, if a key is inputted on a standby screen, the number of displays is counted.

The log data for the specified advertisement includes a screen ID, an advertisement ID and the actually counted number of displays. The log data for each advertisement is uploaded to the WAP server when the terminal automatically accesses the WAP server to download a new advertisement.

The log data is read and configured through the API used when a URL at a time of automatically accessing the WAP and a URL at a time of receiving an SMS message are provided to the library. If the terminal accesses the advertising server 110, the advertising server 110 processes the log data contained in URL data. When the terminal downloads a new advertisement from the server, the log data for an advertisement is reset. Then, log data for the new advertisement is configured.

3.3. In a rule for deleting an advertisement content, the advertising server downloads no new advertisement before the advertisement displayed on the specified screen expires. If the advertising server downloads the new advertisement to the terminal despite the valid advertisement is displayed, the MAS 650 processes the new advertisement as an invalid advertisement. That is, it is determined that the advertising server has an error. However, the valid advertisement can be arbitrarily deleted from the specified screen using an ID and an advertisement content indicating a deletion flag associated with the advertisement to be deleted. Upon receiving the content, the MAS 650 searches for a corresponding advertisement ID and deletes its advertisement data and schedule information, such that the deleted advertisement is not displayed.

4. A method for releasing the AD service will be described.

The AD service release request can be accomplished through various paths of the WAP, call center and web as in the AD service subscription. Where the customer makes the AD service release request through the WAP, a script must be executed as in the AD service subscription through the WAP. In the AD service release, the master flag of a script parameter becomes zero.

Where the AD service is released through the web or call center rather than the WAP, the advertising server 110 must transmit a service release SMS message (having TI=specified value) to the customer as in the above-described service subscription procedure. An SMS message format for the AD service release is the same as that for service subscription and advertisement content download. However, headers of the messages have different values.

The terminal having received the service release SMS message first determines whether the master flag indicating the AD service operation is disabled.

If the master flag has been disabled, the terminal needs to perform no operation for the AD service release. Otherwise, the terminal automatically accesses the WAP server using a URL contained in the service release SMS message. Then, the service is released over the same path as in the service release through the WAP. However, if the customer has not accessed before an SMS message is received, the terminal does not return to the WAP. That is, the terminal must cut off the access to the WAP. Further, when a WML script is executed, the callback URL being the second parameter has a null value. If the terminal recognizes the service release as the WML script is executed, a message indicating that the AD service is ongoing is displayed on an on-line screen.

Several operations for the service release to be performed by the terminal are as follows.

The terminal must reset the master flag indicating the AD service operation upon sending the AD service request. The terminal performs a corresponding operation so that screens other than the specified screen can be set through a screen setting menu. The terminal performs a corresponding operation so that some space of a memory corresponding to the advertising-dedicated storage space is available for the customer.

Technical configurations of the present invention as shown in FIG. 6 will be described below. For convenience, serial numbers are given to the following items.

1. Requirements of the SMS and, terminal in accordance with the present invention will be described.

In the AD service, the SMS push functionality is used for an AD service subscription and release and an advertisement content download. Thus, the terminal provides the SMS push functionality for the AD service. The SMS push functionality is used for the AD service subscription and release and advertisement content download. The SMS messages are discriminated by headers contained in the messages. Upon receiving an SMS message, the terminal accesses the advertising server 110 without waiting for the user's input.

When the AD service is requested/released, i.e., when the customer makes the AD service request or release request through the web or call center, the advertising server 110 confirms the request and transmits an SMS message for the AD service request/release to the terminal 10. Then, the terminal 10 receives the SMS message and checks a master flag from the SMS message. Then, the terminal 10 automatically accesses the advertising server 110 with a URL contained in the SMS message.

When the advertising server downloads the advertisement contents, the advertising server 110 confirms the AD service request from the customer. Then, if the advertising server 110 determines that the AD service for the terminal 10 is possible, the advertising server 110 provides, to the terminal 10, an SMS message for the AD content download at an arbitrary time. In response to the SMS message, the terminal 10 checks the mater flag from the SMS message and automatically accesses the advertising server 110 and download server 120 with a URL contained in the SMS message, such that the terminal 10 can download the advertisement contents.

In SMS messages for the AD service, TIs are the same as each other. The SMS messages can be discriminated according to their header values. That is, an SMS message for the AD service subscription is of a header value "0", an SMS message for the AD service release is of a header value "1", and an SMS message for the AD service download is of a header value "2".

It must be noted that the SMS messages are quickly stored in the terminal 10 so that the user cannot recognize an operation of storing the messages when the SMS messages for the AD service subscription/release/download are received while voice/data communications are performed, and that the terminal 10 attempts to access the network. When the terminal 10 repeatedly receives the SMS message, the repeated message subsequent to the first message is ignored. Optionally, upon receiving the SMS messages for the AD service subscription/release/download, the terminal 10 does not store the messages in a message box and processes the message reception in a mute/non-vibration state.

2. Requirements of the WAP and terminal will be described.

If the terminal accesses the advertising server 110 when the customer makes the AD service request/release request, the advertising server 110 executes the script function (as described in conjunction with the AD service subscription through the WAP) so that the terminal performs the specified operations for setting/releasing the advertising operation. The script function is implemented in the WAP stage.

If the script has been executed, the terminal 10 recognizes the script execution and first determines whether the master flag indicating the AD service operation is currently enabled or disabled. Then, it must be determined whether the AD service request/release request is repeatedly made. That is, if the script for the AD service request has been executed and the master flag has been already enabled, this case corresponds to a repeated request. At this time, the terminal performs no operation for the service request/release request.

Upon receiving an SMS message for the advertisement download at times of downloading the advertisement contents and uploading advertising-related log data, the terminal 10 first determines whether the master flag indicating the AD service operation is currently enabled. If the master flag value is disabled since the AD service subscription has not been appropriately performed due to a service subscription SMS message loss, WAP access failure or script execution failure, the terminal 10 performs no operation for downloading the advertisement content.

When the master flag is enabled, the terminal 10 automatically starts the WAP browser 610.

When the initial access to the WAP is accomplished, URL data for an initial access includes a URL contained in the SMS message for the AD service and the log data for the existing AD service as parameters. The advertising server 110 processes the log data uploaded from the terminal.

3. Requirements of the VM and terminal will be described.

When the advertisement contents are downloaded, the advertisement contents are downloaded to the VM 620 of the terminal 10. The advertisement contents include advertising media and advertising schedule information. The VM 620 downloads the advertisement contents in the form of an executable file associated with a VM application. The number of advertisement contents capable of being contained in one executable file is different according to sizes of media or types of media.

It must be noted that the VM 620 stores the script in the advertising media-related buffer 631 or 632 and does not store the script in other storage memory if the downloaded script is the advertisement content different from a typical VM script.

When the advertisement content is stored, the VM 620 separates the downloaded advertisement content into the advertising media and advertising schedule information. Then, the VM 620 reconfigures the advertising media and advertising schedule information on the basis of an appropriate format. The reconfigured advertising media and advertising schedule information are stored in the non-volatile storage unit 630. Simultaneously, the VM 620 initializes the advertising media information when the MAS 650 creates an advertising schedule, and initializes the advertising-related log data so that the MAS 650 can configure log data associated with a newly downloaded advertisement. At this time, the log data associated with the previous advertisement is reset, and is not uploaded to the server.

To store the advertisement contents and perform an initialization operation, the VM 620 calls an API from the library and functions to be called are provided in the form of the library.

In a procedure of providing a software development kit (SDK) associated with the advertisement contents, the SDK is a tool for easily creating an executable file for advertising. If the user inputs advertising schedule information although advertisement information is too much or complicated after the advertising media is prepared, the SDK generates the executable file for advertising on the basis of the prepared advertising media and the inputted schedule, information so that the VM 620 can automatically download the advertisement contents.

4. Requirements of the terminal on an advertising media type-by-type basis will be described.

In a procedure of reproducing and displaying the advertising multimedia, there are displayed advertisements for the AD service using data on the advertising multimedia type-by-type basis. The terminal must be equipped with the multimedia player 663 including a multimedia decoder on the media type-by-type basis. The screen output is based on a conventional technical standard.

5. Other requirements of the terminal will be described.

In a procedure of processing packet data, a separate network access identifier (NAI) is defined. The defined NAI is stored in the terminal. Upon accessing the network to perform the advertising phone service subscription/release and content download, the terminal accesses the network using a corresponding NAI. At this time, a generated packet data can be separately processed.

Although the present invention has been described in connection with specific preferred embodiments, those skilled in the art will appreciate that various modifications, additions, and substitutions to the specific elements are possible, without departing from the scope and spirit of the present invention as disclosed in the accompanying claims.

The invention claimed is:

1. A method for providing a multimedia advertising service by downloading multimedia contents from a server to a plurality of mobile terminals, comprising the steps of:
   uploading, from a mobile terminal to an advertising server, display history information associated with currently accumulated and stored multimedia content and a request for multimedia content;
   downloading the requested multimedia content and a display condition information corresponding to the requested multimedia content;
   determining on the mobile terminal when an event corresponding to the display condition information occurs; and
   configuring the mobile terminal to execute and display the downloaded content according to the display condition information.

2. The method as set forth in claim 1, wherein the display condition information comprises at least one of a corresponding content identifier (ID), a name of the event, a display time interval, the number of the displays on an interval-by-interval basis, or a period of display time.

3. The method as set forth in claim 2, wherein the event comprises at least one of a terminal power-on state, terminal power-off state, short message service (SMS) message transmission state, call reception state, wireless Internet access state, wireless Internet release state, standby state, download screen display state, or a buffering screen display state.

4. The method as set forth in claim 2, wherein the display condition information is configured so that a plurality of contents associated with a single event can be periodically displayed.

5. The method as set forth in claim 1, wherein the display condition information is configured so that a plurality of contents associated with a single event can be periodically displayed.

6. The method set forth in claim 1, wherein the step (b) is selectively performed according to the corresponding mode setting the state of the mobile terminal.

7. A mobile terminal configured to provide a multimedia advertising service, the mobile terminal comprising:
   communication means for downloading requested multimedia content and display condition information;
   storage means for separately storing the downloaded content and display condition information;

monitoring means for monitoring various events occurring at a mobile terminal operation in real time;

scheduling means for scheduling a display of the downloaded corresponding multimedia content associated with a current event according to a result of the monitoring and the stored display information;

content execution means for executing and displaying the corresponding multimedia content according to the schedule; and uploading means for uploading, from the mobile terminal to an advertising server, display history information associated with the stored multimedia content and the request for multimedia content.

8. The apparatus as set forth in claim 7, wherein the download means performs a download operation with separating of combining simple image service (SIS), moving picture experts group (MPEG), wavelet, flash and/or 3D-based contents.

9. The apparatus as set forth in claim 8, wherein the download means discriminates various contents on a content-by-content basis, and stores the discriminated contents in the storage means.

10. The apparatus as set forth in claim 8, wherein the content execution means comprises:

a multimedia player for reproducing the multimedia content.

11. The apparatus as set forth in claim 7, wherein the storage means stores the display history information associated with the displayed content.

12. A method for controlling multimedia contents of a mobile terminal accessible to a wireless Internet for a multimedia advertising service, comprising the steps of:

(a1) wirelessly receiving access information;

(a2) accessing a corresponding server in response to the access information, and uploading display history information and a request for multimedia content;

(a3) downloading the requested multimedia content and corresponding display condition information;

(b) storing the downloaded content and the corresponding display condition information;

(c) monitoring various events occurring at a mobile terminal operation in real time;

(d) scheduling a display of multimedia content associated with a current event according to a result of the monitoring and the stored display condition information;

(e) executing and displaying the multimedia content according to the schedule; and (f) storing the display history information associated with the displayed content; and (g) uploading, from the mobile terminal to an advertising server, display history information associated with the stored display history information.

13. The method as set forth in claim 12, wherein the access information is received in the form of a short message.

14. The method as set forth in claim 12, wherein after performing the step (a1), the method comprises the steps of:

determining a state of a corresponding service mode setting when the access information is received, and performing steps (a2) and (a3) based upon the state determination.

15. The method as set forth in claim 14, wherein a step of setting a service mode comprises the steps of:

accessing the server on the basis of the access information received through a short message to send a service request or service release request; and setting the service mode to an on or off state in response to a service request-related response message or service release request-related response message.

16. The method as set forth in claim 14, wherein a step of setting a service mode comprises the steps of:

accessing the server on the basis of a user's manipulation to send a service request or service release request; and setting the service mode to an on or off state in response to a service request-related response message or service release request-related response message.

17. The method as set forth in claim 12, wherein the access information is received in the form of a short message before downloading at step a3.

* * * * *